(12) United States Patent
Togawa et al.

(10) Patent No.: US 7,033,662 B2
(45) Date of Patent: Apr. 25, 2006

(54) STRUCTURE FOR FITTING KNOB TO SHAFT

(75) Inventors: Shinichi Togawa, Miyagi-ken (JP); Masakatsu Atsumi, Miyagi-ken (JP)

(73) Assignee: ALPS Electric Co., Ltd., Tokyo (JP)

( * ) Notice: Subject to any disclaimer, the term of this patent is extended or adjusted under 35 U.S.C. 154(b) by 0 days.

(21) Appl. No.: 10/210,728

(22) Filed: Aug. 1, 2002

(65) Prior Publication Data

US 2003/0026941 A1     Feb. 6, 2003

(30) Foreign Application Priority Data

Aug. 6, 2001  (JP) .............................. 2001-237608

(51) Int. Cl.
*B32B 3/06*  (2006.01)
(52) U.S. Cl. ................ 428/99; 428/136; 428/131; 200/341; 200/345; 200/271; 403/345; 403/361; 403/369; D08/300; D08/303; 16/414; 70/207
(58) Field of Classification Search ................ 428/99, 428/136, 131; 200/341, 271, 345; 403/345, 403/361, 369; D08/300, 303; 16/414; 70/207
See application file for complete search history.

(56) References Cited

U.S. PATENT DOCUMENTS 6,184,481 B1 *  2/2001  Chen .......................... 200/5 A
6,328,489 B1 * 12/2001  Chi-Pin ...................... 400/496

* cited by examiner

*Primary Examiner*—Patrick Joseph Ryan
*Assistant Examiner*—Jane Rhee
(74) *Attorney, Agent, or Firm*—Brinks Hofer Gilson & Lione

(57) ABSTRACT

The knob fitting structure is provided with a knob; an operation shaft to which the knob is to be fitted; engaging stubs provided on one of the knob and the operation shaft and supporting side walls having snap-in holes 10*f* provided on the other, wherein the engaging stubs, when they are inserted into the snap-in holes, after elastically deforming the supporting side walls in a direction of thickness of the engaging stubs, are engaged within the snap-in holes, and the supporting side walls are provided with a slit communicating with outside through the snap-in holes.

2 Claims, 4 Drawing Sheets

STRUCTURE FOR FITTING KNOB TO SHAFT

This application claims the benefit of priority to Japanese Patent Application 2001-0237608, which was filed on Aug. 6, 2001.

BACKGROUND OF THE INVENTION

1. Field of the Invention

The present invention relates to a knob fitting structure, and more particularly to a knob fitting structure that can be suitably applied to a push-button switch.

2. Description of the Prior Art

To explain a drawing of a knob fitting structure according to the prior art, FIG. 5 shows an exploded perspective view of the knob fitting structure according to the prior art with the knob cut open.

A knob 51, consisting of a synthetic resin material and formed by molding, has a substantially rectangular top wall 51a, side walls 51b extending substantially vertically from the outer periphery and surrounding the four sides of the top wall 51a, and two pairs of fitting parts 51c extending inward (in the axial direction) from the central of the top wall 51a, and being opposite each other with some space between them and in parallel.

These pairs of the fitting parts 51c are provided with pairs of triangularly shaped engaging parts 51d positioned toward the respective tips away from the top wall 51a and protruding inward to be opposite each other, and the pairs of engaging parts 51d have slopes 51g inclining from the rear end toward the fore end of the fitting parts 51c.

Between the pairs of the fitting parts 51c arranged opposite and in parallel to each other, there is formed a space 51e, and this space 51e communicates with the outside through a groove 51f provided between the pairs of engaging parts 51d.

These pairs of fitting parts 51c are so configured as to be elastically deformed in the widthwise direction of the fitting parts 51c when they are in this state.

A fitting member 52, consisting of a synthetic resin material and formed by molding, has a rectangular base 52a and a quadrangular prismatic operation shaft 52b protruding (extending) outward (in the axial direction) from a front face 52c of the base 52a.

The base 52a also has, in addition to the front face 52c, a rear face 52d opposite the front face 52c and side faces 52e surrounding on four sides the space between the front face 52c and the rear face 52d. Though not illustrated here, this base 52a is so configured as to be able to hold a movable contact.

The operation shaft 52b also has a pair of first side faces 52f on one pair of opposite sides, a pair of second side faces 52g on the other pair of opposite sides, a pair of trapezoid engaging parts 52h protruding outward from prescribed positions on the pair of first side faces 52f, and a tip 52m.

The pair of engaging parts 52h provided on the first side faces 52f are smaller in width on the front side than on the rear side, has a slope 52j, and is formed in a trapezoid having a prescribed thickness.

This fitting member 52 is fitted in a state in which the operation shaft 52b within the space 51e provided between the pairs of fitting parts 51c of the knob 51.

In this state, the pair of engaging parts 51d provided on each pair of fitting parts 51c become engaged with the rear end of the pair of engaging parts 52h provided on each of the paired first side faces 52f of the operation shaft 52b to fit the knob 51 to the fitting member 52.

Next will be described how this knob 51 is fitted to the fitting member 52.

First, in a state in which the engaging parts 51d are opposite the engaging parts 52h, the operation shaft 52b is inserted into the space 51e surrounded by the two pairs of fitting parts 51c with the tip 52m of the operation shaft 52b ahead.

In this way, when the engaging parts 52h are positioned in the groove 51f, the slope 52j and the slopes 51g hit each other. When the operation shaft 52b is further inserted in this state, the pair of engaging parts 52h causes the pairs of engaging parts 51d of the pairs of fitting parts 51c to shift in the widthwise direction of the fitting parts 51c, and the pairs of fitting parts 51c are elastically deformed outward, i.e. in their widthwise direction. When the pairs of engaging parts 51d ride over the pair of engaging parts 52h, the fitting parts 51c are released from the suppression by the engaging parts 52h and return to their original positions, the engaging parts 51d are thereby engaged with the rear end of the engaging parts 52h to complete their incorporation.

At this time, the tip 52m of the fitting member 52 is in contact with inner surface of the top wall 51a of the knob 51 to arrange the knob 51 onto the fitting member 52.

In this knob fitting structure according to the prior art, however, the engaging parts 52h, when they are fitted to the fitting parts 51c, are forced aside by the engaging parts 52h in the widthwise direction, the fitting parts 51c are elastically deformed in the widthwise direction at the root to permit this forcing aside.

This results in the problem that the fitting parts 51c, as they are deformed in the widthwise direction in a strained way, suffer cracks or fractures at the root, and this strained deformation makes it impossible to ensure sufficient fitting strength for the fitting parts 51c.

There is another problem that the fitting parts 51c have to be formed to have a long span to prevent cracks at the foot, inviting an increased fitting space in the axial direction.

An object of the present invention, intended to solve the problems noted above, is to provide a knob fitting structure which allows its knob to be stably fitted to the operation shaft and excels in assembling ease.

SUMMARY OF THE INVENTION

A knob fitting structure according to the invention has a knob; an operation shaft to which the knob is to be fitted; engaging stubs provided on one of the knob and the operation shaft and supporting side walls having snap-in holes provided on the other, wherein the engaging stubs, when they are inserted into the snap-in holes, after elastically deforming the supporting side walls in a direction of thickness of the engaging stubs, are engaged within the snap-in holes, and the supporting side walls are provided with a slit communicating with outside through the snap-in holes.

In this configuration, unlike the prior configuration in which the fitting parts 51c are deformed along with the forcing aside of the engaging parts 51d, the supporting side walls are elastically deformed in the thickness direction of the engaging stubs, and by virtue of this elastic deformation in the thickness direction, a knob fitting structure free from cracks or fractures in the supporting side walls can be provided.

Furthermore, since the supporting side walls are deformed in the thickness direction of the engaging stubs, the supporting side walls can be formed in a short span, making it possible to provide a knob fitting structure permitting a reduction in installation space in the axial direction.

Also, as a slit is provided in the supporting side walls, this slit facilitates elastic deformation without strain and, moreover, the engaging stubs are engaged within the snap-in holes, making it possible to provide a knob fitting structure easy to position and assemble.

In the knob fitting structure according to the invention, the supporting side walls have engaging pieces between one end toward an inserting side of the engaging stubs and the snap-in holes, the slit is provided in the engaging pieces in an axial direction of the operation shaft, and the engaging pieces are elastically deformed when the engaging stubs are inserted.

In this configuration, the engaging pieces provided with a slit are subjected to elastic deformation toward their free end side with even less strain when the engaging stubs are inserted and, after the insertion of the engaging stubs, can return to their original shape from the elastically deformed state without strain, resulting in a knob fitting structure superior in assembling ease.

Furthermore, there can be provided a knob fitting structure engaging pieces can be elastically deformed without strain even if their span is short.

A knob fitting structure according to the invention has a pair of the supporting side walls arranged opposite each other with some space between them, the pair of the supporting side walls being provided with the snap-in holes opposite each other and with the slit and the knob or the operation shaft having a pair of the engaging stubs each provided to match one or the other of the pair of snap-in holes, wherein the knob provided with the pair of engaging stubs or the operation shaft is inserted between the pair of supporting side walls, and each of the pair of engaging stubs is engaged with one or the other of the pair of snap-in holes.

Since in this configuration, the slit provided in each of the pair of supporting side walls, when the pair of engaging stubs are inserted between the pair of supporting side walls, the vicinities of each slit are deformed outward even more easily by the insertion of the pair of engaging stubs, the insertion of the pair of supporting side walls between the pair of engaging stubs is even more facilitated, making it possible to provide a knob fitting structure excelling in assembling ease.

In a knob fitting structure according to the invention, the engaging stubs are provided on the operation shaft and the supporting side walls having the snap-in holes are provided on the knob.

As in this configuration the operation shaft having engaging stubs is inserted between the supporting side walls of the knob, the engaging stubs can be securely arranged onto the operation shaft, and the engaging stubs can be readily engaged in the snap-in holes, making it possible to provide a knob fitting structure even more excellent in assembling ease.

Further, in a knob fitting structure according to the invention, the operation shaft is prismatically shaped, the knob is provided with a pair of supporting side walls arranged opposite each other with some space between them and a pair of linking side walls arranged opposite each other and linking the side edges of the pair of supporting side walls extending in the axial direction of the operation shaft to each other, the pair of supporting side walls and the pair of linking side walls are formed to surround on four sides, and the prismatically shaped operation shaft is arranged between the pair of supporting side walls and the pair of linking side walls surrounding it on four sides.

As this configuration enables the prismatic operation shaft to be securely arranged between the supporting side walls and the linking side walls surrounding it on four sides, positioning is facilitated, and the knob can be fitted to the operation shaft with even greater stability.

Further in the knob fitting structure according to the invention, grooves extending in the axial direction of the operation shaft are provided in the pair of linking side walls from one end positioned on an inserting side of the operation shaft.

In such a configuration, the grooves in the pair of linking side walls, when the operation shaft is inserted between the pair of supporting side walls, the supporting side walls are elastically deformed by the engaging stubs so as to deform the grooves in the expanding direction of the width, and this deformation of the grooves facilitates the insertion of the operation shaft between the supporting side walls, making it possible to provide a knob fitting structure easy to assemble.

DETAILED DESCRIPTION OF THE PREFERRED EMBODIMENT

Figure 1:
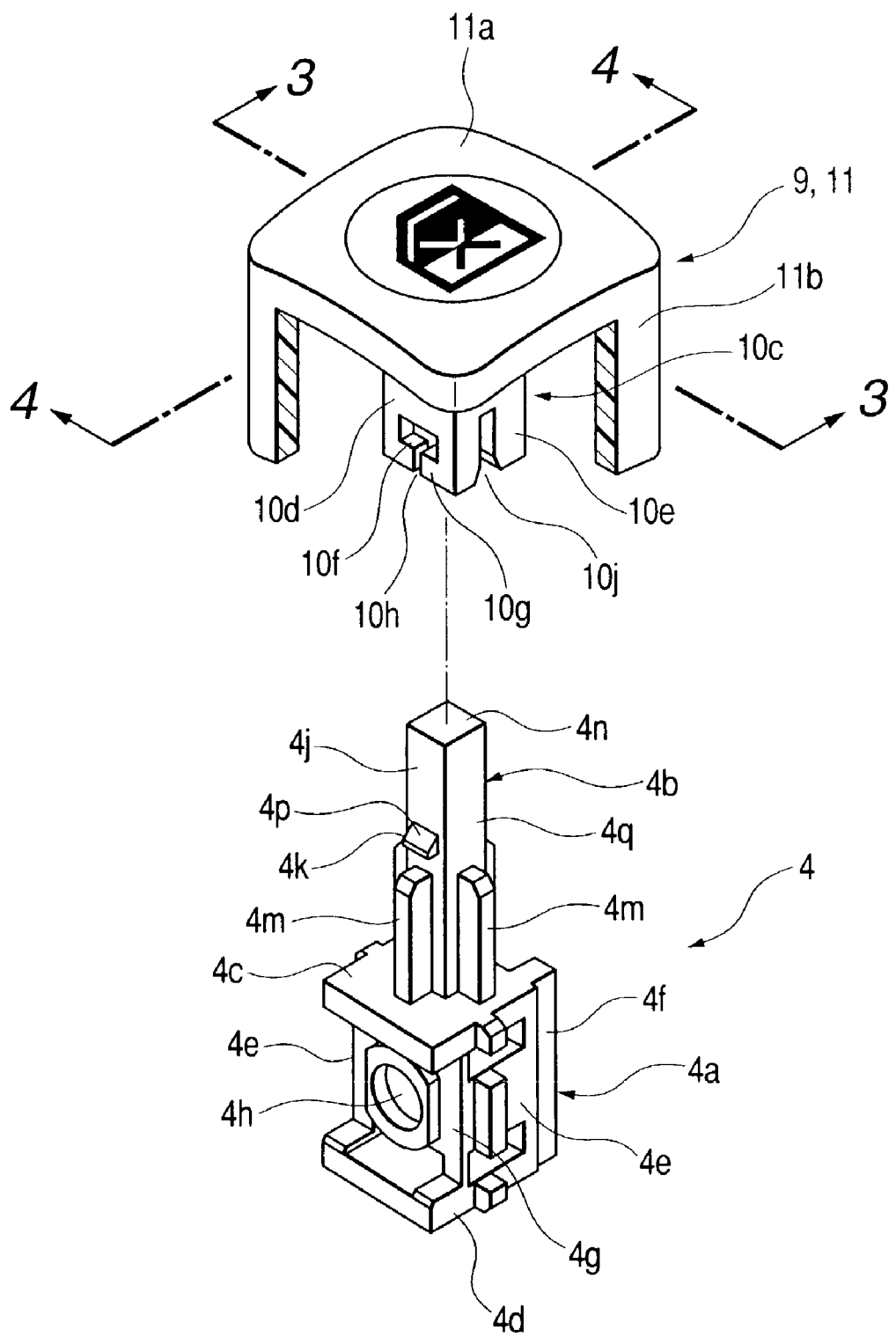
FIG. 1 shows an exploded perspective view of the knob fitting structure in a mode of implementing the present invention with the knob cut open.
Figure 2:
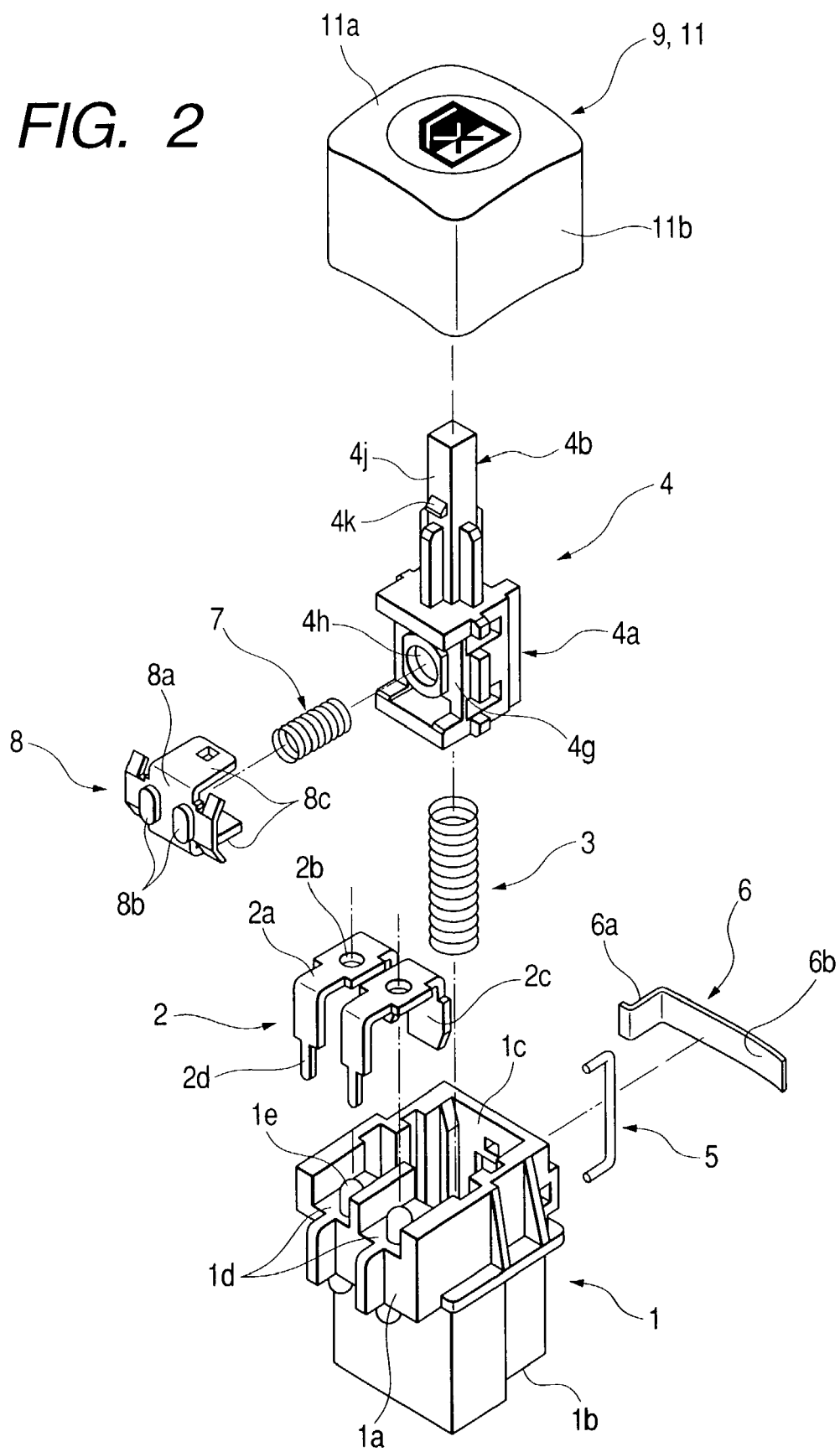
FIG. 2 shows an exploded perspective view of the knob fitting structure in the mode of implementing the invention.
Figure 3:
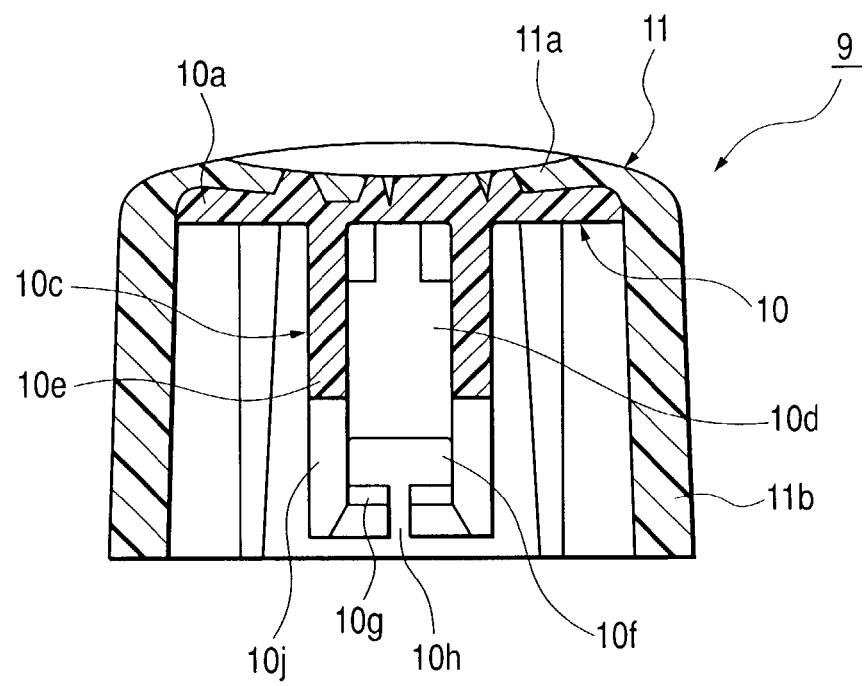
FIG. 3 shows a section of the knob pertaining to the knob fitting structure along line 3—3 in FIG. 1.
Figure 4:
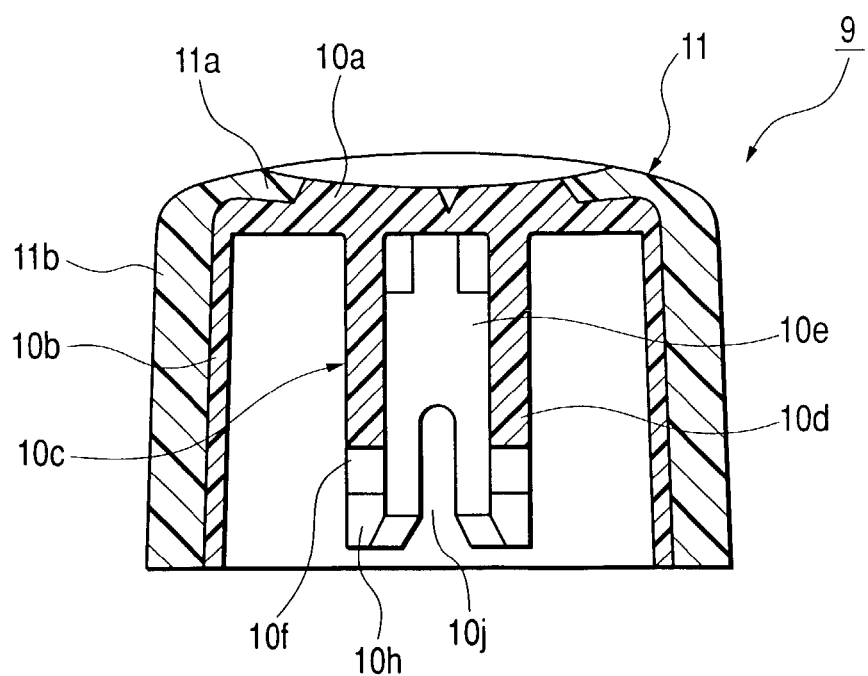
FIG. 4 shows a section of the knob pertaining to the knob fitting structure along line 4—4 in FIG. 1.
Figure 5:
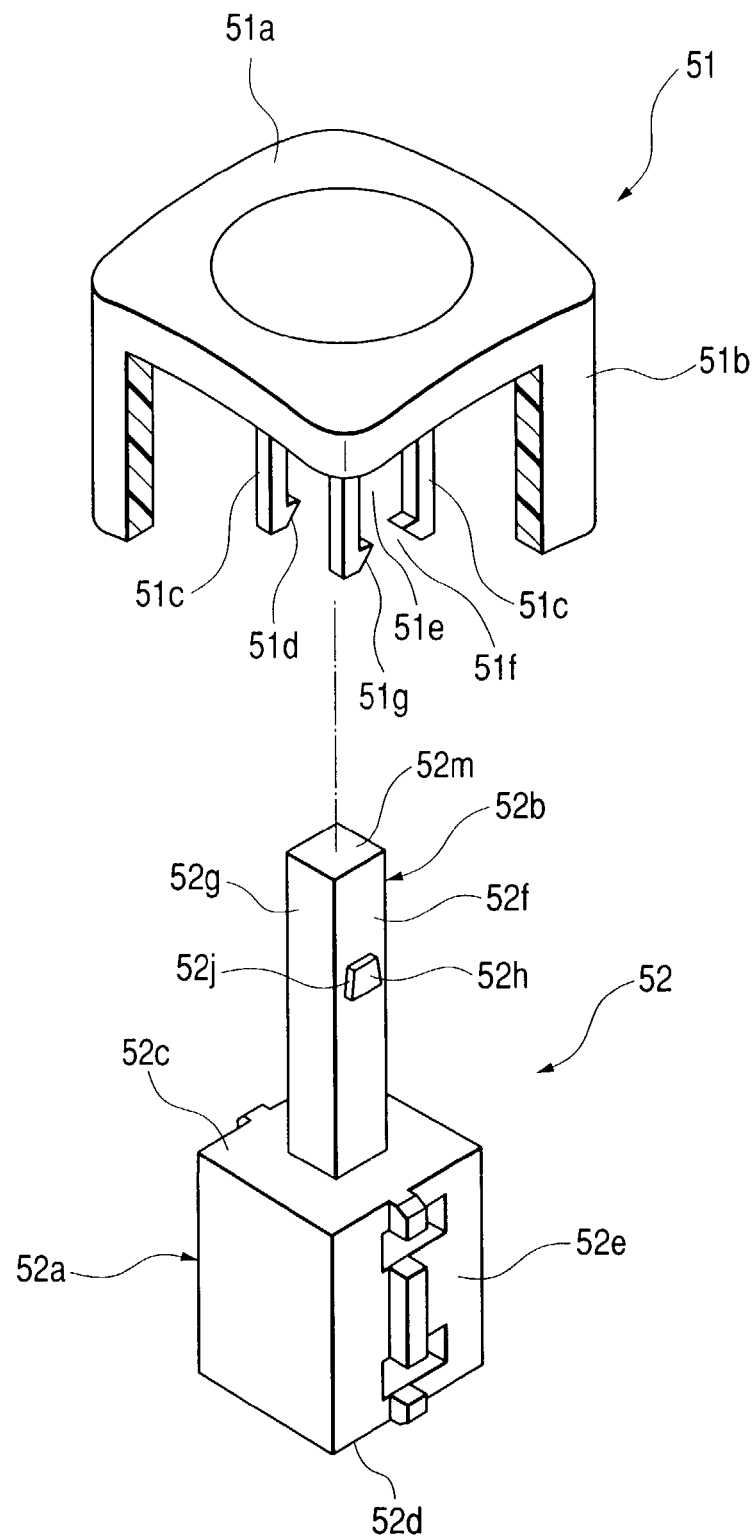
FIG. 5 shows an exploded perspective view of the knob fitting structure according to the prior art with the knob cut open.

To describe the knob fitting structure according to the present invention with reference to accompanying drawings, FIG. 1 shows an exploded perspective view of the knob fitting structure in a mode of implementing the present invention with the knob cut open; FIG. 2 shows an exploded perspective view of the knob fitting structure in the mode of implementing the invention; FIG. 3 shows a section of the knob pertaining to the knob fitting structure along line 3—3 in FIG. 1; and FIG. 4 shows a section of the knob pertaining to the knob fitting structure along line 4—4 in FIG. 1.

The knob fitting structure according to the invention will be described below, by way of example, with reference to its application to a push-button switch device.

A case 1 consisting of a synthetic resin material and formed by molding has side walls 1a surrounding the case 1 substantially four sides, a rear wall 1b covering one end of the side walls 1a, and an open end 1c opposite the rear wall 1b.

Toward the open end 1c of one of the side walls 1a are provided a pair of recesses 1d arranged in parallel to the rear wall 1b and stubs 1e, each protruding outward from the bottom of one or the other of the recesses 1d.

Each of fixed contact members 2, consisting of a metallic plate and formed by pressing, has a planar base 2a, a hole 2b bored substantially at the center the base 2a, a fixed contact 2c extending vertically from one end of the base 2a, and the terminal 2d extending vertically from the other end of the base 2a.

The stubs 1e of the case 1 are pressed through the respective holes 2b in these fixed contact members 2, and the stubs 1e are arranged by positioning the base 2a within the recesses 1d by, for instance, thermal caulking. In this state, the fixed contact 2c is arranged within the case 1 along the inner surface of the side walls 1a, and the terminal 2d is arranged along the outer surface of the side walls 1a of the case 1.

A plurality of (e.g. two) such fixed contact members 2 are arranged.

A first elastic member 3, consisting of a wire-shaped metallic material, is formed in a spiral shape to constitute a so-called coil spring.

This first elastic member 3 is mounted on and held by the bottom wall 1b in the case 1 with one of its ends elastically in contact with the wall.

A movable member 4, consisting of a synthetic resin material and formed by molding, has a substantially rectangular base 4a and a quadrangular prismatic operation shaft 4b protruding (extending) outward (in the axial direction) from a front wall 4c of the base 4a.

The base 4a has the front wall 4c; a rear wall 4d arranged in an opposite position to the front wall 4c and in parallel to the front wall 4c; two first side walls 4e vertically extending from one of a pair of external edges between the front wall 4c and the rear wall 4d and linking the front wall 4c and the rear wall 4d; one second side wall 4f linking the front wall 4c and the rear wall; and one third side wall 4g arranged opposite the second side wall 4f with some space between them and linking the front wall 4c and the rear wall 4d. Thus the third side wall 4g, placed between the front wall 4c and the rear wall 4d, extends in the direction in which some parts of the front wall 4c and the rear wall 4d orthogonally cross the external edges of the third side wall 4g.

The rear wall 4d has a round hole (not shown) in a prescribed position, and the third side wall 4g has a round hole 4h substantially at the center.

This base 4a has a space (not shown) surrounded by the front wall 4c, the rear wall 4d, and the first, second and third side walls 4e, 4f and 4g.

The operation shaft 4b has one pair of opposite first sides 4q; the other pair of second sides 4j; a pair of engaging stubs 4k protruding outward from prescribed positions (e.g. substantially the center) of the pair of second sides 4j; a support 4m extending from the base 4a to the vicinities of the engaging stubs 4k and consisting of four convex bars protruding outward from the first and second sides 4q and 4j in a direction parallel to the axial direction of the operation shaft 4b; and a tip 4n.

The pair of engaging stubs 4k have a prescribed thickness from the surface of the second sides 4j, this thickness being so formed as to gradually increase from the front side toward the rear side of the second sides 4j, and each has a sloped face 4p formed by this thickness increase. These engaging stubs 4k are formed slightly smaller in width than the second sides 4j.

The base 4a of this movable member 4 is arranged within the case 1. Between the space (not shown) of the base 4a and the rear wall 1b of the case 1 is arranged the first elastic member 3, and the elastic force of this first elastic member 3 elastically energizes the movable member 4 in the axial direction of the movable member 4. In this state, the movable member 4 is arranged to be shiftable in the axial direction of the movable member 4 against the springing force of the second elastic member 7.

A drive member 5, consisting of a line-like metal material and formed by pressing, has a U-like overall shape. Of this drive member 5, one end is fitted by a suitable means to one of the side walls 1a of the case 1, and the other end penetrates the other one of the side walls 1a to be fitted by a suitable means to the second side wall 4f of the movable member 4. On the second side wall 4f, where the other end of the drive member 5 is positioned, there is formed a so-called heart cam (not shown), and the other end of the drive member 5 shifts within this heart come to cause the movable member 4 to perform a prescribed action.

A plate spring 6, consisting of an elastic metallic plate and having an L-like overall shape, has a fitting part 6a and a springy part 6b extending vertically from one end of the fitting part 6a.

The fitting part 6a of this plate spring 6 is fitted by a suitable means to one of the side walls 1a of the case 1, and so arranged that the springy part 6b makes the drive member 5 come into elastic contact with that one of the side walls 1a.

The second elastic member 7, consisting of a metallic wire and formed in a spiral shape, constitutes a so-called coil spring.

This second elastic member 7 is inserted and accommodated into the hole 6h in the third side wall 6g of the operation shaft 6, and held by a suitable means. This second elastic member 7 is so arranged as to be elastically deformed in a direction orthogonal to the axial direction of the operation shaft 6.

A movable contact member 8, consisting of a metallic plate and formed by pressing, has a planar base 8a, two substantially oval movable contacts 8b protruding outward from one surface of the planar base 8a and arranged with a prescribed space between them, and a pair of fitting parts 8c each extending vertically from one or the other of the pair of opposite external edges of the planar base 8a.

This movable contact member 8 is so positioned that one end of the second elastic member 7 be in elastic contact with the center of the other surface of the planar base 8a and that the planar base 8a be opposite the third side wall 6g of the operation shaft 6. The pair of fitting parts 8c are fitted between a top wall 6c and a bottom wall 6d of the operation shaft 6.

In this state, two movable contacts 8b are pressed by the elastic force of the second elastic member 7 to move away from the third side wall 6g of the operation shaft 6.

The two movable contacts 8b are brought into elastic contact with the fixed contacts 2c of the two fixed contact members 2.

A knob 9, consisting of a synthetic resin material and formed by dichroic molding, has an inner case 10 and an outer case 11 integrated with and formed so as to cover the inner case 10.

The inner case 10, consisting for instance of a white synthetic resin material, has a substantially rectangular top wall 10a, a pair of side walls 10b extending vertically from a pair of opposite outer edges of the top wall 10a, and a quadrangular cylindrical fitting parts 10c extending inward (in the axial direction) from the center of the top wall 10a.

The fitting parts 10c have a pair of supporting side walls 10d arranged opposite to each other with some space between them, and a pair of linking side walls 10e linking side edges of the pair of supporting side walls 10d extending in the axial direction of the operation shaft 4b and arranged opposite each other. Thus the fitting parts 10c have a space (not shown) surrounded by the pair of supporting side walls 10d and the pair of linking side walls 10e.

Further in the pair of supporting side walls 10d are arranged a pair of substantially rectangular snap-in holes 10f provided in the mutual oppositions of the pair of supporting side walls 10d, a pair of engaging pieces 10g positioned between one end located toward the inserting side of the pair of the engaging stubs 4k of the operation shaft 4b of the movable member 4 and the snap-in holes 10f, and a slit 10h provided in each of the pair of engaging pieces 10g and communicating with the outside from the snap-in holes 10f to one end positioned on the inserting side of the pair of the engaging stubs 4k.

This slit 10h is linearly arranged in the axial direction of the operation shaft 4b.

In each of the pair of linking side walls 10e is provided a groove 10j extending in the axial direction of the operation shaft 4b from one positioned on the inserting side of the operation shaft 4b.

The outer case 11, consisting of a black synthetic resin material for instance, has a substantially rectangular top wall 11a and side walls 11b extending vertically from the outer periphery of and surrounding the top wall 11a on its four sides.

The top wall 11a of the outer case 11 and the top wall 10a of the inner case 10 are integrally formed by dichroic molding, and so arranged that part of the top wall 10a is exposed in the surface of the top wall 11a.

By this partial exposure of the top wall 10a, pictorial signs and character signs, for instance, are formed on the surface of the top wall 11a.

This knob 9 is positioned in a state in which the quadrangular prismatic operation shaft 4b of the movable member 4 is inserted in the quadrangular cylindrical fitting parts 10c of the inner case 10, and the knob 9 is arranged fitted to the movable member 4.

When it is so fitted, the pair of the engaging stubs 4k of the movable member 4 are engaged within the pair of snap-in holes 10f of the inner case 10 of the knob 9.

Next will be described how the knob pertaining to the knob fitting structure according to the present invention is assembled with the operation shaft.

First, in a state in which the slit 10h of the knob 9 is opposite the engaging stubs 4k of the operation shaft 4b, the operation shaft 4b is inserted, with the tip 4n of the operation shaft 4b ahead, into the space surrounded by the pair of supporting side walls 10d and the pair of linking side walls 10e.

Next, when the tip 4n of the operation shaft 4b is inserted into the space, the forward side of the sloped face 4p comes into contact with one end of the engaging pieces 10g arranged at one of the supporting side walls 10d, and then the forward side of the sloped face 4p is positioned at the rear open end of the slit 10h.

Next, as the tip 4n is inserted further inside the space, the forward side of the sloped face 4p comes into contact with the inner surface of the engaging pieces 10g, and the free end of each engaging face 10g, pivoting on its root part, is elastically deformed little by little in the direction of the thickness of the engaging stubs 4k to expand outward little by little.

Then, since the engaging pieces 10g are provided with the slit 10h, the elastic deformation of the free ends of the engaging pieces 10g is ensured to take place in the thickness direction in the vicinities of the slit 10h, and accordingly the engaging pieces 10g are stably subjected to elastic deformation without being broken (e.g. suffering cracks, fractures or yielding).

Further, at substantially the same time as this elastic deformation of the engaging pieces 10g, this groove 10j is deformed to be expanded in width by the insertion of the sloped face 4p of the engaging stubs 4k into the supporting side walls 10d, compared with its original width, because the groove 10j is formed in each of the pair of linking side walls 10e.

As this widthwise variation of the dimension of the groove 10j enables the supporting side walls 10d to escape in the direction of the thickness of the engaging stubs 4k, the prismatic operation shaft 4b can be more easily inserted into the space between the pair of supporting side walls 10d and the pair of linking side walls 10e surrounding it on four sides.

Next, as the tip 4n is further inserted inside the space, the engaging pieces 10g ride over the read side of the sloped face 4p to cause the engaging stubs 4k to be inserted into and engaged with the snap-in holes 10f. Then the engaging pieces 10g in which the slit 10h of the elastically deformed supporting side walls 10d is provided are restored from the elastic deformation by their self-restoring force and arranged in their original positions. The width of the groove 10j is also restored to its original size by its self-restoring force, and the linking side walls 10e are arranged in their original positions.

This causes the engaging pieces 10g to engage with the read end of the engaging stubs 4k so that the engaging stubs 4k are securely engaged within the snap-in holes 10f and the operation shaft 4b is securely arranged between the pair of supporting side walls 10d and the pair of linking side walls 10e surrounding it on four sides.

In this way, the knob 9 is assembled with the operation shaft 4b.

Next will be briefly described the operation of a push-button switch device pertaining to the knob fitting structure according to the present invention.

First, when suppressive force is applied to this knob 9, the knob 9 and the movable member 4 are pressed down against the elastic force of the first elastic member 3, and this pressing down forces part of the movable member 4 into the case 1. When this movable member 4 is pressed into the case 1, each of the two movable contacts 8b of the movable contact member 8 is brought into elastic contact with one or the other of the fixed contacts 2c of the fixed contact members 2 to turn on the push-button switch device.

Then, the drive member 5 performs a prescribed action within a heart cam (not shown) formed the second side wall 4f of the movable member 4.

Next, when a further suppressive force is applied to the knob 9 in this state, the knob 9 and the movable member 4 are further pressed down slightly. After that, when the knob 9 is relieved of the suppressive force, the elastic force of the first elastic member 3 restores the knob 9 and the movable member 4 to their respective original positions to turn off push-button switch device.

To add, although the operation shaft is provided with engaging stubs and the knob is provided with snap-in holes so that the engaging stubs of the operation shaft is inserted into and engaged with the snap-in holes of the knob in the knob fitting structure in this mode of implementing the invention, the invention is not limited to this configuration, and it is also conceivable to provide the operation shaft with snap-in holes and the knob with engaging stubs.

Further, although the operation shaft is prismatically shaped and the knob is formed to be surrounded on four sides by a pair of supporting side walls and a pair of linking side walls linking the side edges of these supporting side walls with each other, and the prismatically shaped operation shaft is arranged between the supporting side walls and the linking side walls surrounding it on four sides in the knob fitting structure in this mode of implementing the invention, the invention is not limited to this configuration, but the operation shaft may as well be columnar or polygonal, and the supporting side walls may be arranged to surround this columnar or polygonal operation shaft.

Also, although a pair of supporting side walls each having a snap-in hole on the knob in the knob fitting structure in this mode of implementing the invention, the invention is not limited to this configuration, and only one supporting side wall having a snap-in hole may be formed, and then only one engaging stub of the operation shaft to be inserted into the snap-in hole may be formed to match the snap-in hole.

Further, the knob fitting structure in this mode of implementing the invention has been described with reference to a push-button switch device pertaining to the knob fitting structure, the invention is not confined to this push-button switch device, and can as well be applied to the knob fitting structure for common electrical parts such as variable resistors.

As hitherto described, the knob fitting structure according to the invention has a knob; an operation shaft to which this knob is to be fitted; engaging stubs provided on one of the knob and the operation shaft, and supporting side walls having snap-in holes provided on the other, wherein the engaging stubs, when they are inserted into the snap-in holes, after elastically deforming the supporting side walls in the direction of the thickness of the engaging stubs, are engaged within the snap-in holes, and the supporting side walls are provided with a slit communicating with outside through the snap-in holes. Thus, when elastically deforming the supporting side walls in the direction of thickness of the engaging stubs, as a slit is provided in the supporting side walls, this slit facilitates elastic deformation without strain and, moreover, the engaging stubs are engaged within the snap-in holes, making it possible to provide a knob fitting structure easy to position and assemble.

A knob fitting structure according to the invention has a pair of the supporting side walls arranged opposite each other with some space between them, the pair of the supporting side walls being provided with the snap-in holes opposite each other and with the slit and the knob or the operation shaft having a pair of the engaging stubs each provided to match one or the other of the pair of snap-in holes, wherein the knob provided with the pair of engaging stubs or the operation shaft is inserted between the pair of supporting side walls, and each of the pair of engaging stubs is engaged with one or the other of the pair of snap-in holes. By virtue of this configuration as well as the slit provided in each of the pair of supporting side walls, when the pair of engaging stubs are inserted between the pair of supporting side walls, the vicinities of each slit are deformed outward even more easily by the insertion of the pair of engaging stubs, the insertion of the pair of supporting side walls between the pair of engaging stubs is even more facilitated, making it possible to provide a knob fitting structure excelling in assembling ease.

Also, in a knob fitting structure according to the invention, the operation shaft is prismatically shaped, the knob is provided with a pair of supporting side walls arranged opposite each other with some space between them and a pair of linking side walls arranged opposite each other and linking the side edges of the pair of supporting side walls extending in the axial direction of the operation shaft to each other, the pair of supporting side walls and the pair of linking side walls are formed to surround on four sides, and the prismatically shaped operation shaft is arranged between the pair of supporting side walls and the pair of linking side walls surrounding it on four sides. Since as a result the prismatic operation shaft is securely arranged between the supporting side walls and the linking side walls surrounding it on four sides, positioning is facilitated, and the knob can be fitted to the operation shaft with even greater stability.

What is claimed is:

1. A knob fitting structure comprising:

a knob;

an operation shaft to which the knob is to be fitted;

an engaging stub provided on one of the knob and the operation shaft; and a supporting side wall having a snap-in hole with a slit communicating with outside through the snap-in hole provided on the other of the knob and the operation shaft, wherein the engaging stub elastically deforms the supporting side wall in a direction of thickness of the engaging stub when the engaging stub is inserted into the snap-in hole, and said supporting side wall is in an essentially undeformed condition subsequent to the insertion of the engaging stub; the operation shaft is prismatically shaped, the knob is provided with a pair of supporting side walls arranged opposite each other with some space between the pair of supporting side walls and a pair of linking side walls arranged opposite each other and linking side edges of the pair of supporting side walls extending in an axial direction of the operation shaft to each other, wherein the pair of supporting side walls and the pair of linking side walls are formed to surround on four sides, and wherein the prismatically shaped operation shaft is arranged between the pair of supporting side walls and the pair of linking side walls surrounding the operation shaft on four sides.

2. The knob fitting structure according to claim 1, wherein grooves extending in the axial direction of the operation shaft are provided in the pair of linking side walls from one end positioned on an inserting side of the operation shaft.

* * * * *

(12) EX PARTE REEXAMINATION CERTIFICATE (6789th)
United States Patent
Togawa et al.

(10) Number: US 7,033,662 C1
(45) Certificate Issued: Apr. 28, 2009

(54) STRUCTURE FOR FITTING KNOB TO SHAFT

(75) Inventors: Shinichi Togawa, Miyagi-ken (JP); Masakatsu Atsumi, Miyagi-ken (JP)

(73) Assignee: ALPS Electric Co., Ltd., Ota-ku, Tokyo (JP)

Reexamination Request:
No. 90/008,832, Aug. 31, 2007

Reexamination Certificate for:
Patent No.: 7,033,662
Issued: Apr. 25, 2006
Appl. No.: 10/210,728
Filed: Aug. 1, 2002

(51) Int. Cl.
*B32B 3/06* (2006.01)

(52) U.S. Cl. ............................ 428/99; 16/414; 200/341; 200/345; 200/271; 403/345; 403/369; 403/361; 428/136; 428/131; D8/300; D8/303; 70/207

(58) Field of Classification Search ........................ None
See application file for complete search history.

(56) References Cited

FOREIGN PATENT DOCUMENTS

| JP | 57-52034 | 3/1982 |
|---|---|---|
| JP | 63-15518 | 2/1988 |
| JP | 5-6514 | 1/1993 |

*Primary Examiner*—Terrence R Till

(57) ABSTRACT

The knob fitting structure is provided with a knob; an operation shaft to which the knob is to be fitted; engaging stubs provided on one of the knob and the operation shaft and supporting side walls having snap-in-holes 10*f* provided on the other, wherein the engaging stubs, when they are inserted into the snap-in holes, after elastically deforming the supporting side walls in a direction of thickness of the engaging stubs, are engaged within the snap-in holes, and the supporting side walls are provided with a slit communicating with outside through the snap-in holes.

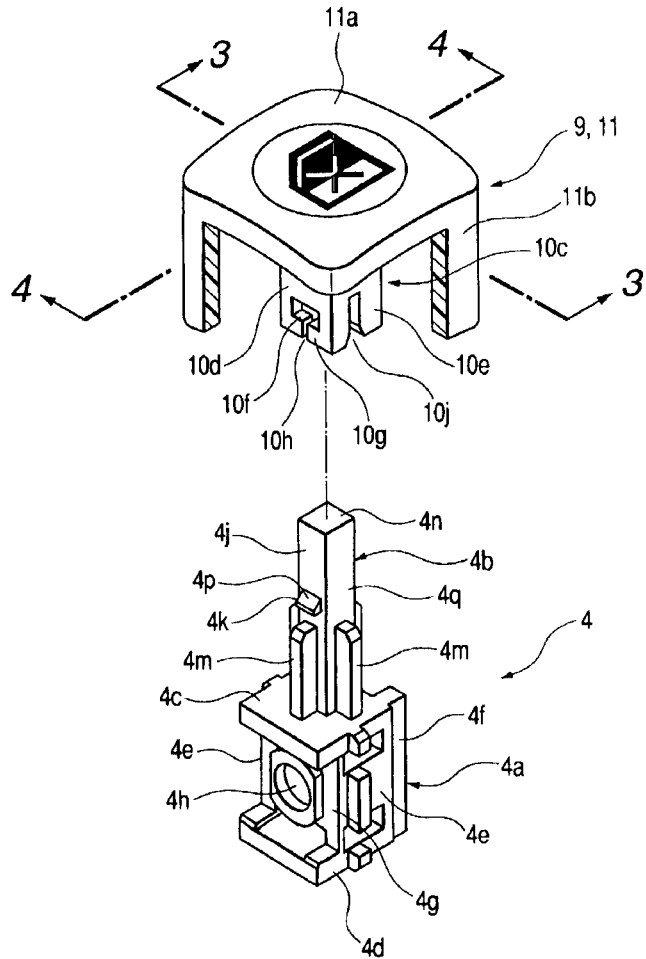

FIG. 3
(Amended)
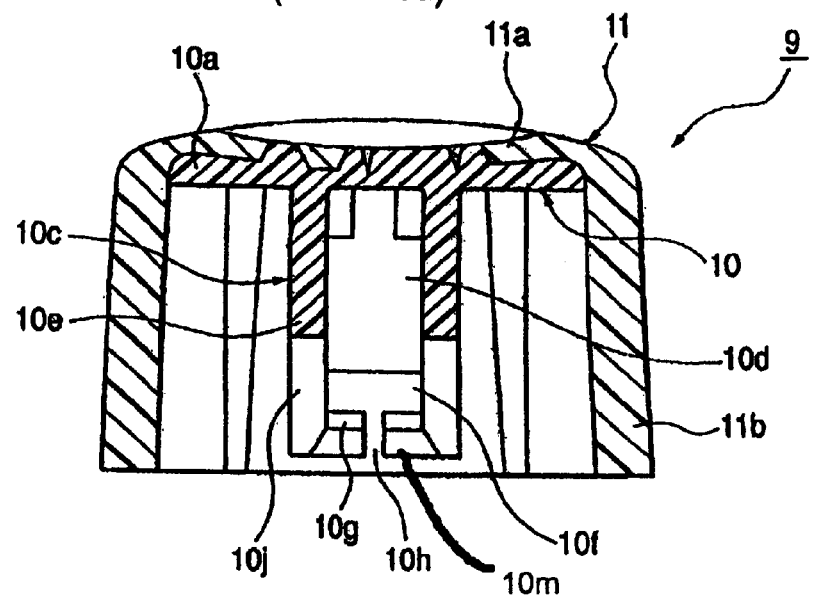
FIG. 4
(Amended)
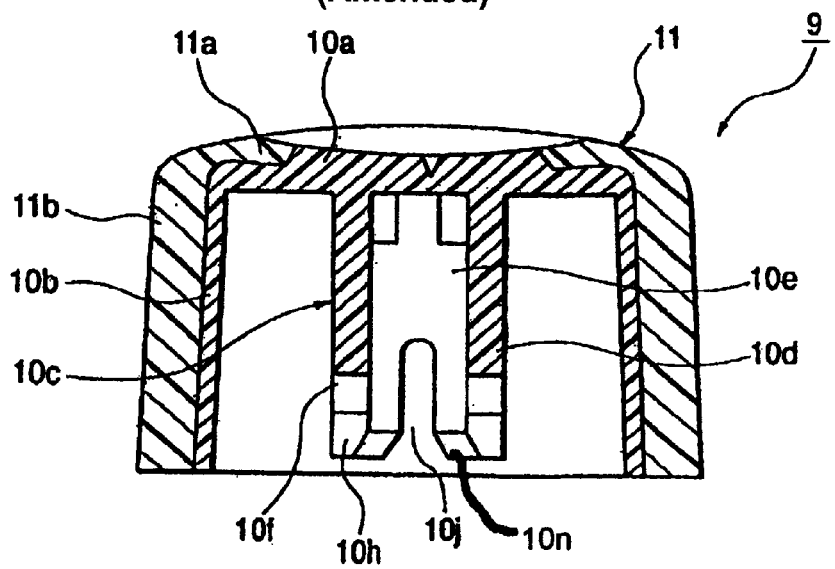

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 7, lines 7–8:

This slit 10h is linearly arranged in the axial direction of the operation shaft 4b. *The supporting side wall 10d may have a rectangular 10m at an end thereof and may also have a sloped face 10n at an inner position at the end thereof.*

THE DRAWING FIGURES HAVE BEEN CHANGED AS FOLLOWS:

FIG. 3 Added 10m.
FIG. 4 Added 10n.

AS A RESULT OF REEXAMINATION, IT HAS BEEN DETERMINED THAT:

Claim 1 is determined to be patentable as amended.

Claim 2, dependent on an amended claim, is determined to be patentable.

New claims 3–8 are added and determined to be patentable.

1. A knob fitting structure comprising:
a knob;
an operation shaft to which the knob is to be fitted:
an engaging stub provided on one of the knob and the operation shaft; and
a supporting side wall having a snap-in hole with a slit communicating with outside through the snap-in hole provided on the other of the knob and the operation shaft,
wherein the engaging stub elastically deforms the supporting side wall in a direction of thickness of the engaging stub when the engaging stub is inserted into the snap-in hole, and said supporting side wall is in an essentially undeformed condition subsequent to the insertion of the engaging stub; the operation shaft is prismatically shaped, the knob is provided with a pair of supporting side walls arranged opposite each other with some space between the pair of supporting side walls and a pair of linking side walls arranged opposite each other and linking side edges of the pair of supporting side walls extending in an axial direction of the operation shaft to each other, wherein the pair of supporting side walls and the pair of linking side walls are formed to surround on four sides, and wherein the prismatically shaped operation shaft is arranged between the pair of supporting side walls and the pair of linking side walls surrounding the operation shaft on four sides*; and*
*wherein each of the supporting side walls has sloped faces at inner positions at an end thereof.*

*3. The knob fitting structure of claim 2, wherein each of the linking side walls has the groove at an end thereof.*

*4. The knob fitting structure of claim 1, wherein the engaging stub has a sloped face so that the thickness of the engaging stub gradually increases along a direction in which the operation shaft is inserted.*

*5. The knob fitting structure of claim 1, wherein each of the supporting side walls has engaging pieces having a rectangular shape at an end thereof, so that each of the engaging pieces has a flat surface at the end thereof.*

*6. The knob fitting structure of claim 1, wherein each of the supporting side walls has the snap-in hole at an end thereof.*

*7. The knob fitting structure of claim 6, wherein each snap-in hole has a rectangular shape.*

*8. The knob fitting structure of claim 6, wherein each snap-in hole is formed between inner surfaces of the pair of supporting side walls.*

\* \* \* \* \*